United States Patent

Kubota et al.

[11] Patent Number: 5,259,775
[45] Date of Patent: Nov. 9, 1993

[54] FLAT CABLE CONNECTOR

[75] Inventors: Kazuhisa Kubota; Hiroyasu Ito, both of Aichi, Japan

[73] Assignee: Kabushiki Kaisha Tokai Rika Denki Seisakusho, Aichi, Japan

[21] Appl. No.: 936,665

[22] Filed: Aug. 28, 1992

Related U.S. Application Data

[62] Division of Ser. No. 781,409, Oct. 23, 1991, Pat. No. 5,171,153.

[51] Int. Cl.$^5$ ............................................. H01R 35/04
[52] U.S. Cl. ...................................... 439/164; 439/15
[58] Field of Search ................................. 439/15, 164

[56] References Cited

U.S. PATENT DOCUMENTS

| | | | |
|---|---|---|---|
| 3,763,455 | 10/1973 | Confer et al. | 439/15 |
| 4,540,223 | 9/1985 | Schmerda et al. | 439/15 |
| 4,753,599 | 6/1988 | Kokubu et al. | 439/15 |
| 4,867,688 | 9/1989 | Suzuki | 439/15 |
| 4,875,860 | 10/1989 | Suzuki | 439/15 |
| 4,978,191 | 12/1990 | Hasegawa et al. | 439/15 |
| 5,046,951 | 9/1991 | Suzuki | 439/15 |
| 5,102,061 | 4/1992 | Suzuki et al. | 439/15 |

*Primary Examiner*—Gary F. Paumen

[57] ABSTRACT

A flat cable connector including a first planetary roller, and a plurality of second planetary rollers as a flat cable guiding members, and a planetary gear mechanism for revolving the first roller round a rotor in an annular space between the rotor and a stator. The flat cable is turned at the first planetary roller so that the flat cable is wound in the opposite directions between the inside and outside of the second planetary rollers. The planetary gear mechanism is constructed to satisfy the relationship expressed as: $a = b \times \{D_i/(D_i + D_o)\}$, where $a$ is the angular velocity of the planetary gear in its revolution; $b$ is the angular velocity of the rotor with respect to the stator; $D_i$ is the diameter of an inner circumferential wall of the annular space; and $D_o$ is the diameter of the outer circumferential wall thereof. The amount of the flat cable fed out from or to the inner circumferential wall of the annular space is almost equal to the amount of the flat cable wound along or fed out from the outer circumferential wall of the annular space.

4 Claims, 6 Drawing Sheets

FLAT CABLE CONNECTOR

This application is a divisional of copending application Ser. No. 07/781,409, filed on Oct. 23, 1991, now U.S. Pat. No. 5,171,153, the entire contents of which are hereby incorporated by reference.

BACKGROUND OF THE INVENTION

1. Field of the Invention

The present invention relates to a flat cable connector for electrically connecting two members, in which one rotates with respect to the other, such as a steering wheel and steering column of an automobile.

2. Description of the Related Arts

Conventionally, a flat cable connector of the following type is known. A rotor and a stator forms an annular space therebetween so as to accommodate a flat cable in the annular space by winding it spirally One end of the flat cable is fixed to the rotor and the other end thereof is fixed to the stator so as to electrically connect the rotor and the stator with each other.

In the flat cable connector of the above type, the flat cable is tightened or loosened according to the rotation of the rotor with respect to the stator. As a result, the diameter of the spirally wound flat cable is varied. Therefore, the area of the annular space is large enough to accommodate the loosened flat cable.

However, since the annular space is a little large with respect to diameter of the loosened flat cable, the flat cable is movable in the interior of the flat cable connector mounted on a steering device due to the vibration of an automobile body. When the winding condition of the flat cable is varied due to the rotation of the steering wheel, there may be a frictional contact in the flat cable, in which case, a sound is generated.

SUMMARY OF THE INVENTION

It is therefore an object of the present invention to provide a flat cable connector in which the generation of a sound due to the loosening of the flat cable in the flat cable connector is prevented.

It is another object of the present invention to detect the winding condition of the flat cable.

It is a further object of the present invention t prevent the flat cable from being damaged or broken by providing a construction in which a rotor is not allowed from rotating excessively with respect to a stator.

In accomplishing these and other objects, there is provided a flat cable connector comprising: space;

a carrier for rotatably supporting the first planetary roller;

and driving means, driven by the rotation of the rotor, for revolving the first planetary roller round the inner circumferential wall of the annular space.

In the above construction, the first planetary roller has an outer diameter adjusted s that the flat cable is capable of passing through the space between the first planetary roller and the inner circumferential wall of the annular space and between the first planetary roller and the outer circumferential wall thereof, and the flat cable is turned at the first planetary roller so that the winding direction of the cable is opposite between the outside and inside of the first planetary roller; and the driving means is constructed to satisfy a relationship expressed as: $a = b \times \{D_i/(D_i + D_o)\}$, where $a$ is an angular velocity of the planetary roller in its revolution; $b$ is an angular velocity of the rotor with respect to the stator; $D_i$ is a diameter of the inner circumferential wall of the annular space; and $D_o$ is the diameter of the outer circumferential wall thereof. The connector further comprises guide means supported by the carrier in the annular space, and having an outer surface for regulating the flat cable wound along the outer circumferencial wall and an inner surface for regulating the flat cable wound round the inner circumferencial wall.

According to the above construction, the flat cable moves in the annular space with the guidance of the guide means when the rotor is rotated. The first planetary roller revolves round the rotor according to the rotation of the rotor. In the revolution of the rotor the angular velocity ($a$) of the rotor is controlled by the operation of the driving means so that the equation of $a = b \times \{D_i/(D_i + D_o)\}$ is satisfied. For example, supposing that the diameter $D_o$ of the outer circumference of the annular space is twice as large as the diameter $D_i$ of the inner circumference of the annular space, the angular velocity ($a$) of the planetary rotor is one-third of the angular velocity ($b$) of the rotor. That is, the planetary roller revolves round the rotor to the extent of one-third of the outer circumference of the annular space per rotation of the rotor. Assuming that the flat cable is fed out from the inner circumferential wall of the annular space, the length of the flat cable is equal to two-thirds of the length of the inner circumference of the annular space. That is, the length of the flat cable fed out is almost equal to one-third of the length of the outer circumference of the annular space. Therefore, the length of the flat cable fed out from the inner circumferential wall of the annular space is equal to the length of the flat cable wound round the outer circumferential wall of the annular space. When the rotor rotates reversely, the length of the flat cable fed out from the outer circumferential wall of the annular space is equal to the length of the flat cable wound round the inner circumferential wall of the annular space.

Therefore, no frictional contacts occur in the flat cable from during the rotation of the rotor. Thus, no sounds are generated. In addition, the planetary roller does not move the flat cable in the radial direction of the rotor because the flat cable is regulated by the guide means. Accordingly, the flat cable does not loosen.

According to another embodiment, there is provided a flat cable connector comprising:

an inner gear having its axis on the axis of the rotor and formed on the stator;

an outer gear coaxial with the inner gear and having the same module as the inner gear has and a smaller diameter than the inner gear;

a plurality of planetary gear having a first gear engaging the inner gear and the outer gear and a second gear coaxial with the first gear;

a ring having an inner gear engaging the second gear and rotatably mounted on the stator; and indicating means, for indicating the rotational position of the rotor, mounted on the ring and the stator.

According to the above construction, when the rotor rotates, the planetary gear revolves round the rotor. Since the number of the teeth is differentiated from each other in the first and second gears of the planetary gear, the number of the teeth of the inner gear of the stator is different from the number of the teeth of the inner gear of the ring. Therefore, the ring rotates a certain extent per revolution of the planetary gear around the rotor due to the difference in the gear ratio between the inner gear of the stator and the first gear of the planetary gear and between the inner gear of the ring and the second gear of the planetary gear. The indicating means provided on the ring and the stator indicates accurately the extent of the rotation of the rotor with respect to the stator. That is, how the flat cable has been wound can be reliably detected.

In the above construction, the first gear and the second gear have the same module and pitch diameter so that the planetary gear consists of one gear, and the inner gear of the ring and the inner gear of the stator are slightly varied from each other in the pitch diameter or the module thereof so that the number of the teeth of the inner gears are differentiated from each other.

According to the above construction, the ring rotates according to the rotation of the rotor. Therefore, the indicating means accurately detects the rotational position of the rotor. Further, the planetary gear consists of one gear, which contributes to an easy manufacture.

In the above construction, a guide roller revolving round the rotor together with the planetary gear is mounted on the planetary gear, and the flat cable is fixed to the stator by being wound round the guide roller in a length of approximately half the circumference of the guide roller in the direction opposite to the direction in which the flat cable is wound round the rotor.

According to be above construction, a much shorter flat cable is used, which leads to a low manufacturing cost.

According to a further embodiment, the flat cable connector comprises an inner gear having its axis on the axis of the rotor and formed on the stator;

an outer gear coaxial with the inner gear and having the same module as the inner gear has and a smaller diameter than the inner gear;

a plurality of planetary gear having a first gear engaging the inner gear and the outer gear and a second gear coaxial with the first gear;

a ring having an inner gear, rotatably mounted on the stator, engaging the second gear of the planetary gear and having a different number of teeth from that of the inner gear of the stator; and first and second stop means cooperating with each other to restrict the rotation of the ring to a predetermined range are formed on the stator and the ring, respectively.

According to the above construction, when the rotor rotates, the planetary gear revolves round the rotor. Since the inner gear of the ring is differentiated from the inner gear of the stator in the number of the teeth. Therefore, when the planetary gear revolves round the rotor, the ring rotates a certain extent due to a different gear ratio. The first and second means prevent the ring from rotating beyond a predetermined extent. Consequently, the planetary gear is prevented from moving further. As a result, the rotor stops.

The flat cable is not greatly stressed owing to the first and second stop means which stops the rotation of the rotor before the flat cable is tightly wound around the inner circumferential wall of the annular space or strained along the outer circumferential wall thereof. Thus, the flat cable is not damaged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiments thereof with reference to the accompanying drawings which are given by way of illustration only, and thus are not limitative of the present invention, and in which.

DETAILED DESCRIPTION OF THE INVENTION

Figure 1:
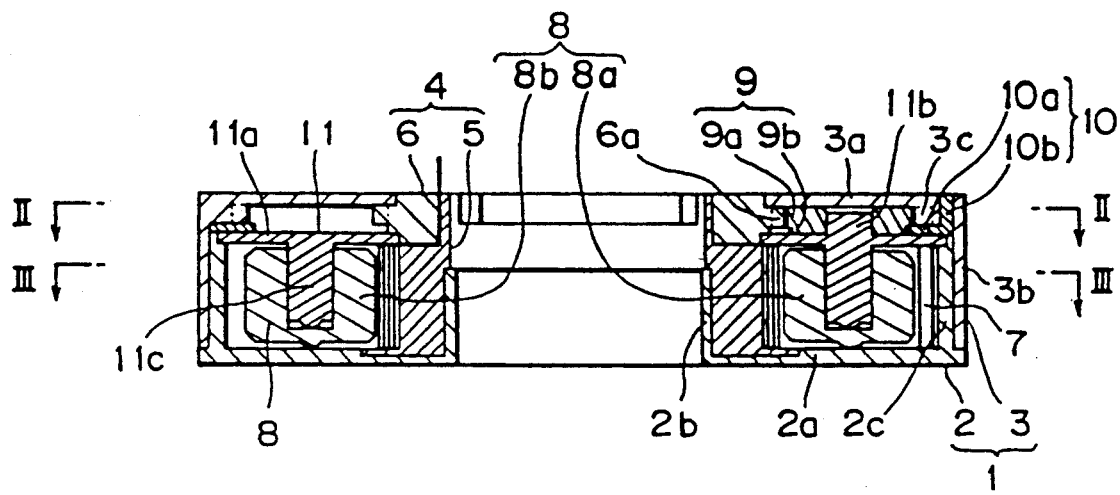
FIG. 1 is a vertical section showing a flat cable connector according to a first embodiment of the present invention.

Referring to FIGS. 1 through 4, a first embodiment of the present invention is described below.

A stator 1 of the flat cable connector comprises a first stator member 2 comprising a bottom wall 2a, an inner circumferential wall 2b, and an outer circumferential wall 2c and a second stator member 3 comprising an upper wall 3a and an outer circumferential wall 3b fitting over the outer circumferential wall 2c of the first stator member 2. A rotor 4 comprises a first rotor member 5 substantially cylindrical and rotatably fitting over the inner circumferential wall 2b of the first stator member 2 and a second rotor member 6 substantially annular and rotatably fitting over the first rotor member 5. The following members are accommodated in the annular space between the stator 1 and the rotor 4: A spiral flat cable 7, a ring 10 serving as a means for indicating the winding condition of the flat cable 7, a planetary gear 9 for driving the ring 10, planetary rollers 8 for guiding the flat cable 7, and a carrier 11 serving as a means for supporting the planetary rollers 8 and the planetary gear 9. The planetary rollers 8 includes, a first roller 8a for turning the flat cable 7, and seven second rollers 8b for regulating the flat cable 7 against the inner surface of the wall 2c and the outer surface of the first rotor member 5.

The carrier 11 comprises a ring-shaped plate 11a, a first shaft 11b formed on the upper surface of the plate 11a, and eight second shafts 11c formed on the lower surface of the plate 11a. The second shafts 11c are located at the annular space between the stator 1 and the rotor 4 and are equally spaced. The planetary gear 9 is mounted on the first shaft 11b. Eight planetary rollers 8 are respectively mounted on the second shafts 11c. The inner circumferential edge of the plate 11a is rotatably supported between the first rotor member 5 and the second rotor member 6 and the outer circumferential edge of the plate 11a is rotatably supported between the first stator member 2 and the second stator member 3.

Figure 3:
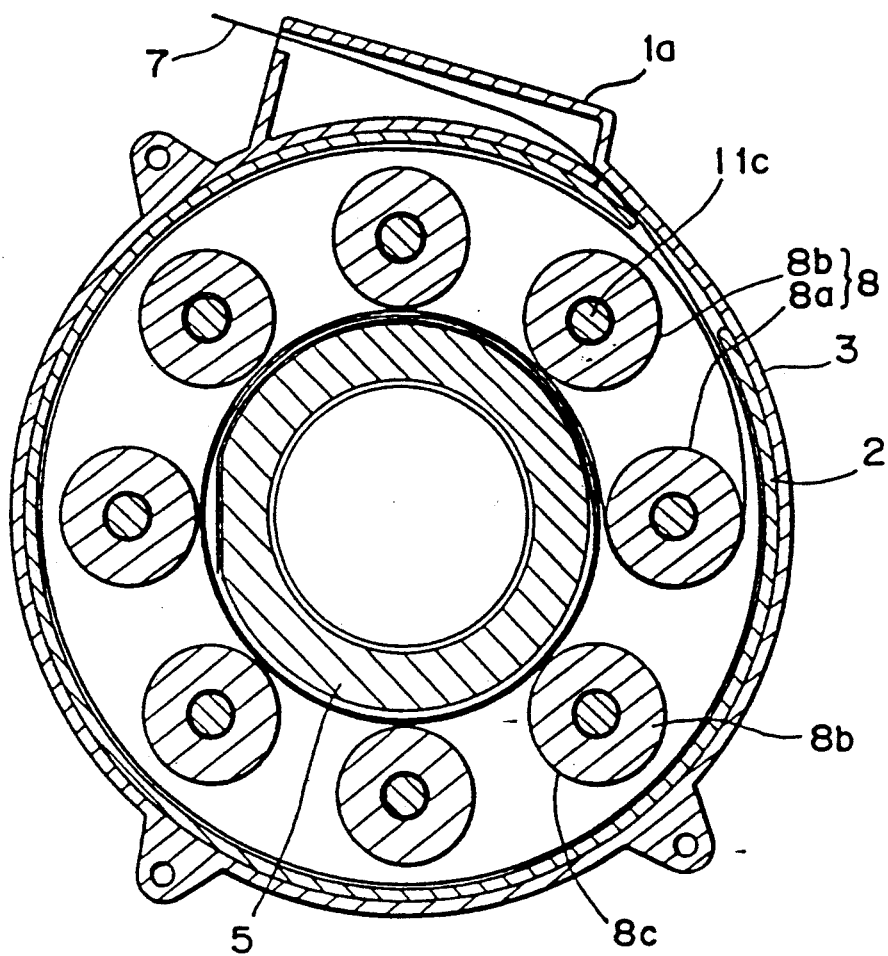
FIG. 3 is a section taken along the line III—III of FIG. 1.

The planetary gear 9 comprises a first gear 9a having a pitch diameter, which is approximately equal to the outer diameter of the first roller 8a and a second gear 9b having teeth less than the first gear 9a. An outer gear 6a and an inner gear 3c in mesh with the first gear 9a are formed on the second rotor member 6 and the second stator member 3, respectively. The diameter of the pitch diameter of the outer gear 6a and the inner gear 3c is approximately equal to the diameter Di of the inner circumference of the annular space and the diameter Do of the outer circumference thereof. Thus, a planetary gear train, for driving the first roller 8a, comprising the inner gear 3c, the outer gear 6a, and the planetary gear 9 is constructed. It is necessary to pass the flat cable 7 between the planetary rollers 8 and the outer circumferential wall 2c and between the planetary rollers 8 and the inner circumferential wall thereof, as shown in FIG. 3. It is also necessary to engage the planetary gear 9 with the inner gear 6a and the outer gear 3c. The dimensions as described above are not strictly true from the standpoint as described above.

Figure 4:
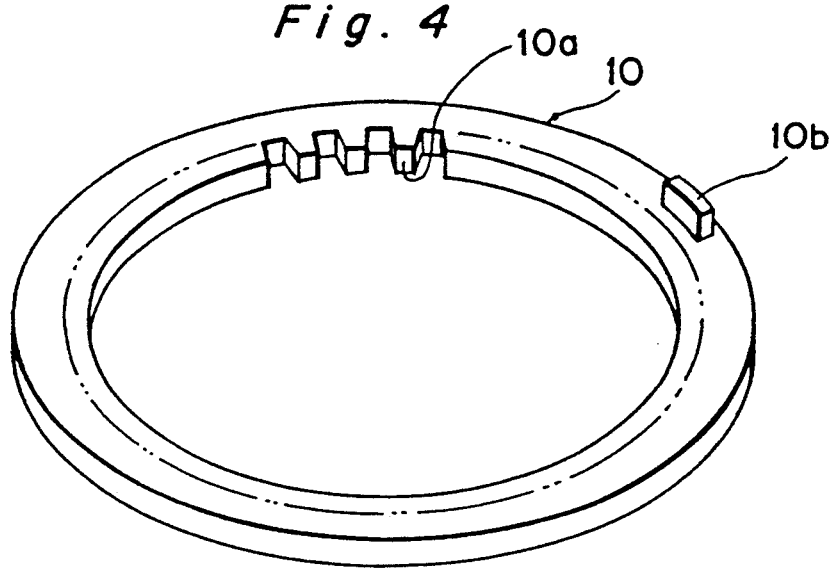
FIG. 4 is a perspective view showing a ring.

As shown in FIG. 4, the ring 10 comprises an inner gear 10a engaging the second gear 9b of the planetary gear 9 and an indicating projection 10b projecting upwardly from the upper surface of the gear 9. Since the inner gear 10a engages the second gear 9b, the pitch diameter of the inner gear 10a is smaller than that of the inner gear 3c, i.e., the number of the teeth of the inner gear 10a is smaller than the number of the teeth of the inner gear 3c. The indicating member 10b of the ring 10 is inserted into a slot 3d formed in the second stator member 3.

As shown in FIGS. 1 and 3, one end of the flat cable 7 is fixed between the first rotor member 5 and the second rotor member 6 and the flat cable 7 is wound around the rotor 4. The other end thereof is turned at the first rotor 8a and fixed to the stator 1 at a convex portion 1a thereof. The seven second rotors 8b regulate or urge inwardly the part flat cable 7 wound around the rotor 4, while they regulate or urge outwardly the other part of the flat cable 7 wound along the wall 2c of the stator 1.

Figure 2:
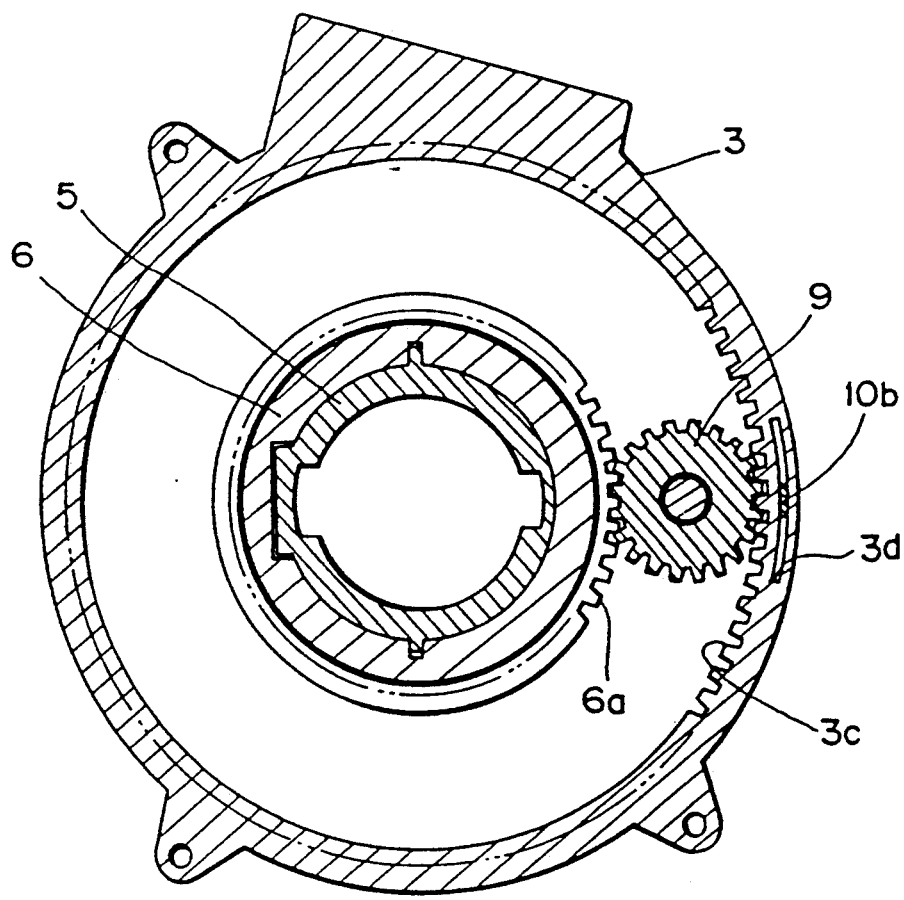
FIG. 2 is a section taken along the line II—II of FIG. 1.

According to the flat cable connect or having the above construction, when the rotor 4 rotates clockwise in FIGS. 2 and 3, the planetary gear 9 revolves clockwise round the rotor 4, while it is rotating on its axis counterclockwise. The angular velocity (a) of the planetary gear 9 and the first roller 8a in the revolution thereof round the rotor 4 is slower than the angular velocity (b) of the rotor 4 because the planetary gear 9 and the first roller 8a rotate on the axis thereof. The relationship between the angular velocities (a) and (b) is expressed as follows: $a = b \times \{Di/(Di+Do)\}$. Supposing that the pitch diameter of the outer gear 3c is twice as great as that of the inner gear 6a, namely, supposing that the diameter Do of the outer circumference of the annular space is approximately twice as great as the diameter Di of the inner circumference thereof, the planetary gear 9 and the planetary rollers 8 revolves round the rotor 4 to the extent of one-third of the circumference of the annular space per rotation of the rotor 4. The length of the flat cable 7 fed out from the rotor 4 per rotation of the rotor 4 is obtained by subtracting one-third of the inner circumference of the annular space from the inner circumference thereof, namely, two-thirds of the inner circumference of the annular space (outer circumference of the first rotor member 5). Two-thirds of the inner circumference of the annular space is almost equal to one-third of the outer circumference of the annular space, namely, the length of the circular arc of the outer circumference of the annular space described by the revolution of the first roller 8a. Thus, the length of the flat cable 7 fed out from the inner circumferential wall of the annular space is equal to the length of the flat cable 7 wound round the outer circumferential wall of the annular space. When the rotor 4 is rotating, no frictional contact occurs in the flat cable 7. Therefore, no sounds are generated. In addition, when the rotor 4 is rotating, the flat cable 7 does not move in the radial direction of the rotor 4. Therefore, the flat cable 7 is not loosened or tightened.

When the planetary gear 9 is at the original position after it revolves round the rotor 4, the indicating projection 10b is dislocated from the original position thereof due to the difference in the gear ratio between the first gear 9a and the inner gear 3c and between the second gear 9b and the inner gear 10a. Accordingly, how the flat cable 7 has been wound can be accurately detected based on the rotational position of the indicating projection 10b by a graduation provided in the vicinity of the slot 3d to indicate the position of the indicating projection 10b per rotation of the rotor 4. Further, the length of the slot 3d may be appropriately set so that the indicating projection 10b stops in contact with either of the ends of the slot 3d. As a result, the flat cable 7 can be prevented from excessively rotating, therefore from being damaging or broken.

In addition, as described above, the flat cable 7 is wound round the first roller 8a half the circumference thereof in the direction opposite to the direction in which the flat cable 7 is wound on the rotor 4. Compared with the conventional method of winding the flat cable 7 in the same direction from one end to the other end thereof, the length of the flat cable 7 required in this embodiment is much shorter than that required in the conventional method.

For example, supposing that the outer diameter of the rotor 4 is 50mm, the inner diameter of the stator 1 is 100mm, the number (n) of the necessary rotations of the rotor 4 is four the winding number of the rotor 4 when the flat cable 7 is in close contact with the outer circumferential wall of the rotor 4 is $n_1$, and the winding number of the rotor 4 when the flat cable 7 is in close contact with the inner circumferential wall of the stator 1 is $n_2$, the approximate length $L_1$ of the flat cable 7 required by a conventional flat cable connector is:

$$L_1 = 50\pi n_1 = 100\pi n_2 \text{ and}$$

$$n_1 - n_2 = 4$$

Therefore, $L_1 \approx 1257$mm

The length $L_2$ of the flat cable 7 required according to the embodiment of the present invention is.

$$L_2 = 100\pi \times n \times 50/(50+100)$$

Therefore, $L_2 \approx 419$mm which is much shorter than $L_2$. That is, compared with the length required by the conventional flat cable connector, according to the present invention, a much shorter flat cable is sufficient.

Figure 5:
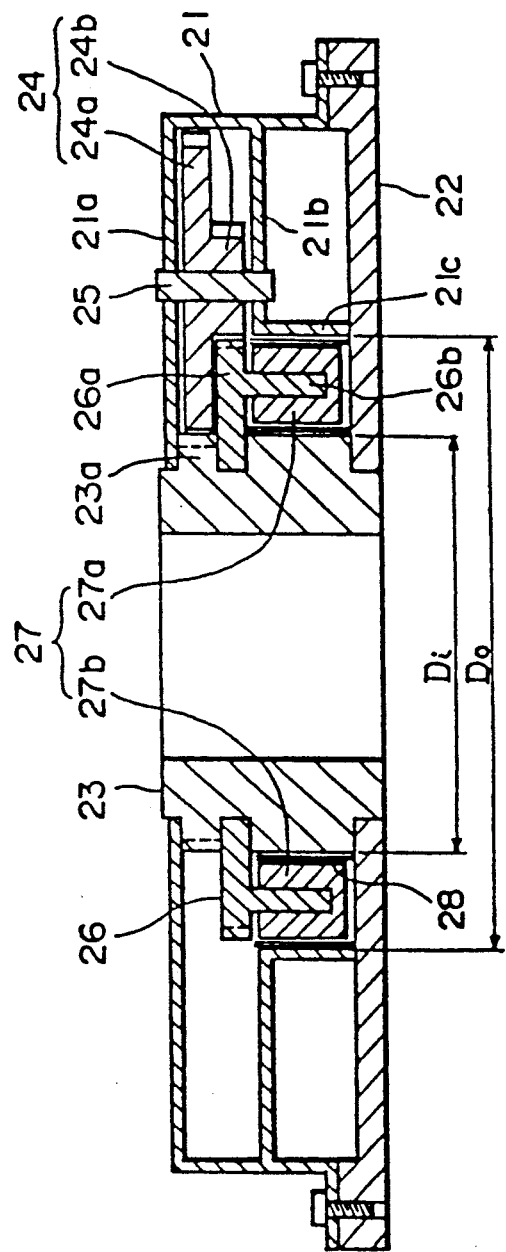
FIG. 5 is a vertical section showing a flat cable connector according to a second embodiment of the present invention.

A second embodiment of the present invention is described below with reference to FIG. 5 which is a vertical section showing a flat cable connector according to the second embodiment. The flat cable connector comprises a stator 21, with a stator base 22, and a rotor 23. An outer gear 23a is formed on an upper portion of the rotor 23. An intermediate (planetary) gear 24 comprising a first gear 24a engaging the outer gear 23a and a second gear 24b integrated with the first gear 24a and having a small diameter than the first gear 24a is rotatably mounted on the stator 21 by a shaft 25. Both vertical ends of the shaft 25 are supported by an upper wall 21a and a lower wall 21b. A carrier (ring) 26 comprising shafts 26b and a gear 26a engaging the second gear 24b of the intermediate gear 24 is rotatably mounted on a rotor 23.

Similarly to the first embodiment, planetary rollers 27 comprising a first roller 27a and seven second rollers 27b are respectively held below the carrier 26 by the shafts 26b which are equally spaced in an annular space between the stator 21 and the rotor 23. The diameter of the planetary rollers 27 is set so that a flat cable 28 is capable of passing between the planetary rollers 27 and the outer circumferential surface of the rotor 23 (inner circumferential wall of the annular space). A slight gap is formed between a peripheral wall 21c serving as the outer circumferential wall of the annular space and the planetary rollers 27 so that the flat cable 28 is capable of passing therebetween. The number of teeth of the gears 23a and 24 and the gear 26a of the carrier 26 serving as the means for driving the first roller 27 is set so that the reduction ratio of the revolution of the carrier 26 (around the rotor 23) with respect to the rotation of the rotor 23 satisfies the relationship expressed as $a = b \times \{D_i/(D_i + D_o)\}$, where $D_o$ is the diameter of the outer circumference of the annular space, $D_i$ is the diameter of the inner circumference thereof, a is the angular velocity of the planetary roller 27 in its revolution around the rotor 23, and b is the angular velocity of the rotor 23. Similarly to the first embodiment, the flat cable 28 is turned at the circumference of the first roller 27a.

Since the above-described construction is capable of preventing the flat cable 28 from loosening and the angular velocity (a) of the first planetary roller 27a in its revolution around the rotor 23 is slower than the angular velocity (b) of the rotation of the rotor 23, the length of the flat cable 28 fed out from the outer circumferential wall of the inner circumference of the annular space is equal to the length of the flat cable 28 wound round the inner circumferential wall of the outer circumference of the annular space. Therefore, when the rotor 23 is rotating, no frictional contact occurs in the flat cable 28. Therefore, no sounds are generated.

Figure 6:
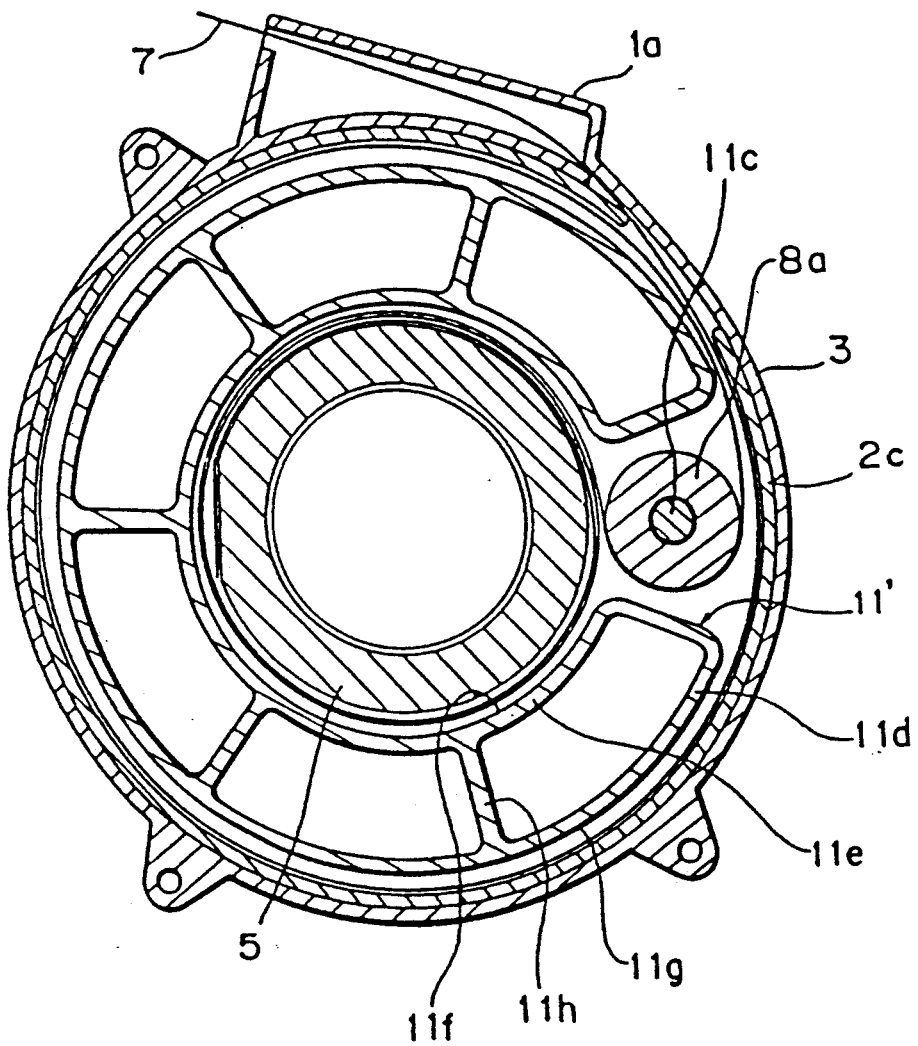
FIGS. 6 and 7 are sections, similar to FIG. 3, according to third and fourth embodiments of the present invention.

Next, the third embodiment of the present invention is described with reference to FIG. 6.

In this embodiment, only the guide means according to the first embodiment is modified so that the construction thereof is basically the same as the first embodiment. The modified features will be described in detail below.

The guide means corresponding to the second rollers 8b of the first embodiment has a circular double wall construction which includes an outer guide wall 11d and inner guide wall 11e respectively formed in the annular space between the outer circumferential wall 2c and the inner circumferential wall 5 on the ring-shaped plate of the carrier 11', and a plurality of ribs 11h extending radially so as to connect the outer and inner guide walls 11d and 11e with each other. The first roller 8a is rotatably mounted on the shaft 11c extending from the carrier. A small space outer guide wall 11d so that the flat cable 7 may be wound along the wall 2c in the small space. Similarly, another small space is formed between the inner circumferential wall 2c and the inner guide wall 11e so that the flat cable may be wound round the rotor 4 in the small space. An outer surface 11g of the guide wall 11d and an inner surface 11f of the guide wall 11e function as the regulating surfaces against the wound flat cable 7, respectively. Similarly to the first embodiment, one end of the cable 7 is fixed on the rotor 4 and the flat cable 7 is wound around the rotor 4. The other end thereof is turned at the first rotor 8a and fixed to the stator 1 at the convex portion 1a thereof.

With the above construction according to the third embodiment, similarly to the first embodiment, the wound flat cable 7 is prevented from loosing so that the generation of a sound may be avoided. The first embodiment has an advantage that each second roller 8b can rotate when the flat cable 7 moves in the annular space so that the flat cable 7 can move smoothly. On the contrary, this third embodiment has an advantage that the construction of the guide means can be simplified as compared with a plurality of second roller 8b.

Figure 7:
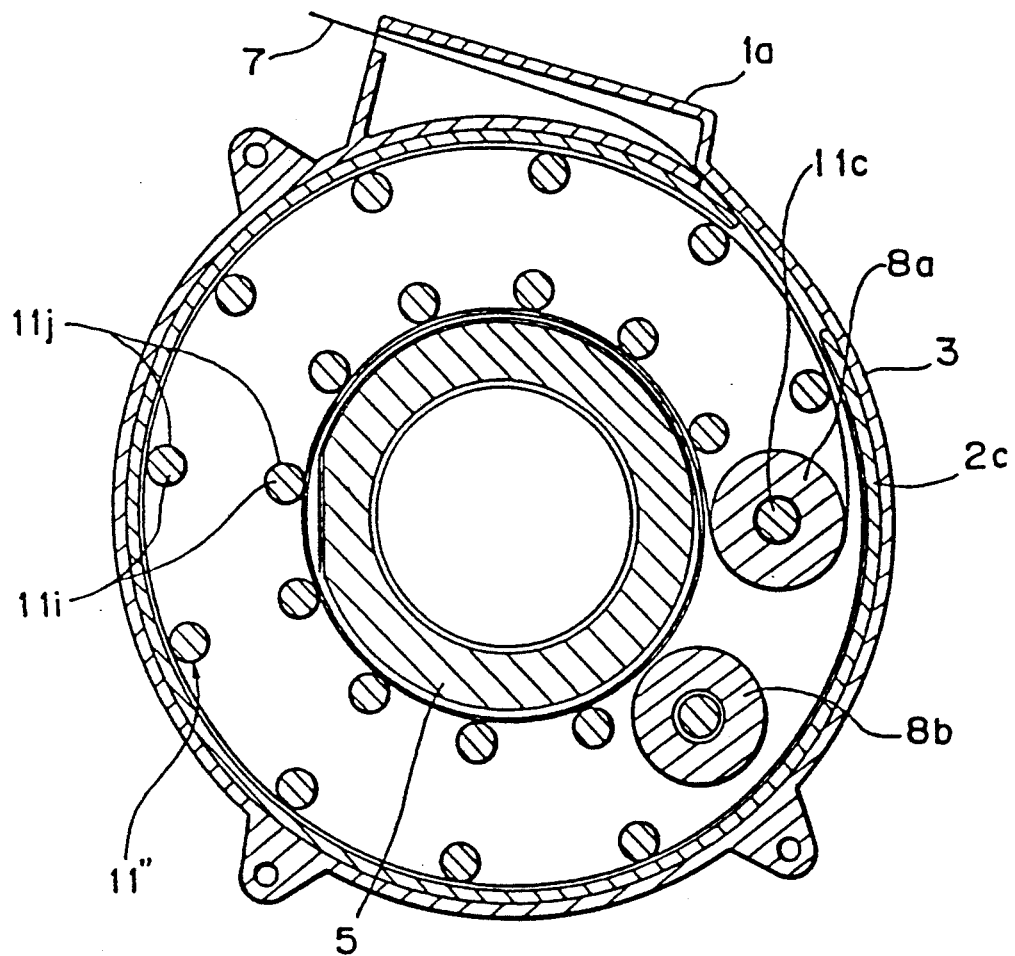

In the third embodiment, the double wall type guide means may be replaced by a plurality of guide projections, such as the ribs 11h as described above, extending from the ring-shaped plate of the carrier and arranged circularly in the annular space which may divide the flat cable 7 in two parts, i.e. inner and outer sides of the projections. FIG. 7 shows an example of the projections.

Referring to FIG. 7, the guide projections comprises two circular rows of guide pins 11j extending from the ring-shaped plate of the carrier 11". The outer row of guide pins correspond to the outer guide wall 11d, and the inner row of guide pins correspond to the inner guide wall 11e. Although a second roller 8b is shown in FIG. 7, it may be removed.

Figure 8:
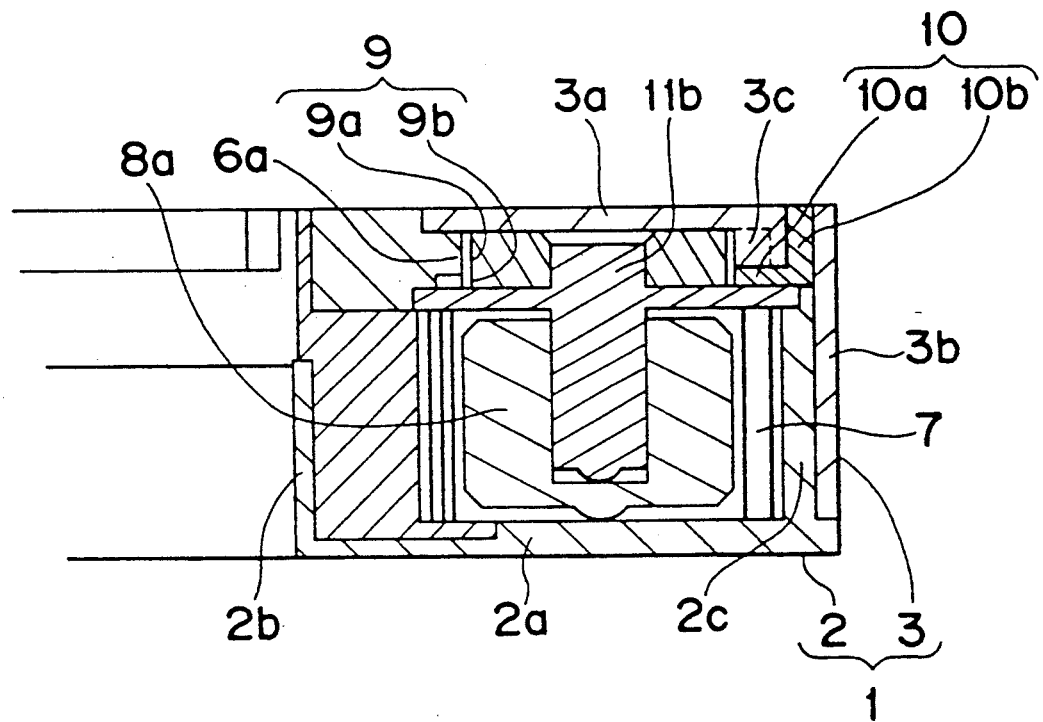
FIG. 8 is a sectional view showing a further modification of the planetary gear.

In addition to the above-described embodiments, the present invention can be embodied as follow:

For example, in FIG. 8 the first gear 9a and second gear 9b of the planetary gear 9 may have the same module and the same pitch diameter so that the planetary gear 9 may consist of one gear. In order to dislocate the ring 10 from the original position thereof after the planetary gear 9 revolves round the rotor 4, either the gear 10a or the gear 3c of the second stator 3 may be formed as a shifted gear by differentiating the module of the gear 10a or the gear 3c slightly from each other. Otherwise, the pitch diameter of the gear 10a or the gear 3c may be changed slightly to differentiate the number of teeth of the gear 10a or the gear 3c from each other, although the gear 10a does not accurately engage the second gear 9b of the planetary gear 9 or the gear 3c does not accurately engage the first gear 9a of the planetary gear 9 compared with the case where the gear 10a or the gear 3c is formed as a shifted gear. The change of the number of teeth of the gear 10a or the gear 3c does not cause no problems in indicating the rotational position of the rotor 4.

Thus, how the flat cable has been wound can be accurately detected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A flat cable connector comprising:

a stator;

a rotor rotably mounted on said stator;

a flat cable spirally accommodated in an annular space defined between the stator and the rotor, one end of the flat cable being fixed to said rotor and the other end thereof being fixed to said stator;

an inner gear having an axis thereof of an axis of said rotor and formed on said stator;

an outer gear coaxial with said inner gear and having the same module as said inner gear and having a smaller diameter than said inner gear;

a planetary gear having a first gear engaging said inner gear and said outer gear and a second gear coaxial with said first gear;

a ring having an inner gear engaging said second gear and rotatably mounted on said stator; and indicating means for indicating the rotational position of said rotor, the indicating means being mounted on said ring and said stator.

2. The flat cable connector as defined in claim 1, wherein said first gear and said second gear have the same module and pitch diameter so that said planetary gear comprises one gear, and said inner gear of said ring and said inner gear of said stator are slightly varied from each other in the pitch diameter or the module thereof so that the number of the teeth of said inner gears are differentiated from each other.

3. The flat cable connector as defined in claim 1, wherein a guide roller revolving around said rotor together with said planetary gear is mounted on said planetary gear; and said flat cable is fixed to said stator by being wound around said guide roller in a length of approximately half the circumference of said guide roller in the direction opposite to the direction in which said flat cable is wound around said rotor.

4. The flat cable connector as defined in claim 3, further comprising first stop means and second stop means cooperating with each other to restrict the rotation of said ring to a predetermined range, the first and second stop means being formed on said stator and said ring, respectively.

* * * * *